United States Patent
Pereira et al.

(10) Patent No.: US 8,975,560 B2
(45) Date of Patent: Mar. 10, 2015

(54) LIP UNIT FOR AN ELECTRICALLY DEICED TURBOJET ENGINE NACELLE

(71) Applicant: Aircelle, Gonfreville L'Orcher (FR)

(72) Inventors: David Pereira, Montigney-le-Bretonneux (FR); Michel Dunand, Balma (FR)

(73) Assignee: Aircelle, Gonfreville l'Orcher (FR)

( * ) Notice: Subject to any disclaimer, the term of this patent is extended or adjusted under 35 U.S.C. 154(b) by 0 days.

(21) Appl. No.: 14/227,628

(22) Filed: Mar. 27, 2014

(65) Prior Publication Data
US 2014/0209592 A1    Jul. 31, 2014

Related U.S. Application Data

(63) Continuation of application No. PCT/FR2012/052006, filed on Sep. 7, 2012.

(30) Foreign Application Priority Data

Sep. 28, 2011  (FR) ...................................... 11 58678

(51) Int. Cl.
| | |
|---|---|
| *B60L 1/02* | (2006.01) |
| *B64D 15/04* | (2006.01) |
| *B64D 15/12* | (2006.01) |
| *B64D 33/02* | (2006.01) |
| *H05B 3/20* | (2006.01) |
| *B64D 29/00* | (2006.01) |

(52) U.S. Cl.
CPC ................ *B64D 15/12* (2013.01); *B64D 33/02* (2013.01); *H05B 3/20* (2013.01); *H05B 2203/003* (2013.01); *B64D 2033/0233* (2013.01); *B64D 29/00* (2013.01)

USPC ......................................... 219/205; 244/134 R

(58) Field of Classification Search
CPC ............................... B64D 15/163; B64D 15/12
USPC ..................... 219/205; 60/39.093; 244/134 R
See application file for complete search history.

(56) References Cited

U.S. PATENT DOCUMENTS

| | | | |
|---|---|---|---|
| 2,699,303 A * | 1/1955 | Chilman | 244/134 D |
| 4,688,757 A | 8/1987 | Cook et al. | |
| 7,922,120 B2 * | 4/2011 | Kumar et al. | 244/134 D |
| 2008/0179448 A1 | 7/2008 | Layland et al. | |
| 2009/0095842 A1 * | 4/2009 | Gaertner et al. | 244/134 D |

(Continued)

FOREIGN PATENT DOCUMENTS

| | | |
|---|---|---|
| EP | 1 495 963 A2 | 1/2005 |
| EP | 1 715 159 A1 | 10/2006 |

(Continued)

OTHER PUBLICATIONS

International Search Report issued Nov. 14, 2012 in International Application No. PCT/FR2012/052006.

*Primary Examiner* — Henry Yuen
*Assistant Examiner* — Alba Rosario-Aponte
(74) *Attorney, Agent, or Firm* — Brinks Gilson & Lione

(57) ABSTRACT

A lip assembly of a turbojet engine nacelle is equipped with at least one electric de-icing system. The lip assembly includes at least one electric heating member, electrically powered through at least one power conductor. Each power-supply conductor is associated with a neutral conductor or "ground" arranged in a regrouped manner adjacent to a corresponding power-supply conductor.

7 Claims, 2 Drawing Sheets

(56) References Cited

U.S. PATENT DOCUMENTS

2010/0199629 A1* 8/2010 Chene et al. ............... 60/39.093
2010/0294882 A1* 11/2010 Gantie et al. .................. 244/1 N
2011/0120076 A1* 5/2011 Vauchel ..................... 60/39.093

FOREIGN PATENT DOCUMENTS

GB  2 432 409  5/2007
WO  2006/136748 A2  12/2006

* cited by examiner

LIP UNIT FOR AN ELECTRICALLY DEICED TURBOJET ENGINE NACELLE

CROSS-REFERENCE TO RELATED APPLICATIONS

This application is a continuation of International Application No. PCT/FR2012/052006, filed on Sep. 7, 2012, which claims the benefit of FR 11/58678, filed on Sep. 28, 2011. The disclosures of the above applications are incorporated herein by reference.

FIELD

The present disclosure relates to a member for heating an electrical de-icing device for equipping a turbojet engine nacelle.

BACKGROUND

The statements in this section merely provide background information related to the present disclosure and may not constitute prior art.

An aircraft is propelled by one or several propulsion assemblies, each comprising a turbojet engine housed in a substantially tubular nacelle. Each propulsion assembly is attached to the aircraft by a mast, usually located under a wing or at the aircraft fuselage.

In general, a nacelle has a substantially tubular structure surrounding the turbojet engine and comprises an air inlet upstream of the engine, a median section intended to surround a fan of said turbojet engine, and a downstream section surrounding the combustion chamber of the turbojet engine, which can be equipped with thrust reversal means.

On the one hand, the air inlet comprises an inlet lip adapted to allow the optimal uptake into the turbojet engine of the air necessary for powering the fan and the inner compressors of the turbojet engine and on the other hand, a downstream structure whereon the lip is brought and intended to channel the air properly, towards the fan vanes. The assembly is attached upstream of a fan casing, belonging to the median section of the assembly.

In flight, according to temperature, pressure and humidity conditions, ice may appear on the nacelle, particularly at the outer surface of the air inlet lip. The presence of ice or frost changes the aerodynamic properties of the air intake and disturbs the air conveyance towards the fan.

A solution to de-ice or deglaze the outer surface is to prevent the formation of ice on this outer surface, by keeping the concerned surface at sufficient temperature.

Thus, it is known for example from document U.S. Pat. No. 4,688,757, to take hot air at the compressor of the turbojet engine and bring it at the air inlet lip in order to heat the walls. However, such a device requires a system of hot air inlet ducts between the turbojet engine and the air inlet, as well as a system for discharging the hot air at the air inlet lip. This increases the mass of the propulsion assembly, which is not required. These drawbacks can be overcome by resorting to electric de-icing systems.

It can be particularly cited document EP 1 495 963 although several other documents relate to the electric de-icing and its developments.

The implementation of an electric de-icing device needs the use of heaters, also called heating carpets, embedded at the air inlet lip adjacent to the outer surface, and electrically powered by a generally three-phased electric power.

A disadvantage of such systems is that they are located in a nacelle area that is particularly exposed to the most severe direct effects of lightning. This leads to induced currents in the device and heating carpets which are particularly high. These induced currents are propagated through the system power harness and may severely damage the system equipment.

SUMMARY

The present disclosure provides a lip assembly of a turbojet engine nacelle equipped with at least one electric de-icing system comprising at least a resistive heating member electrically powered by at least a power-supply conductor, each power-supply conductor being associated with a neutral conductor or "ground", arranged in a grouped manner adjacent to the corresponding power-supply conductor.

In fact, it has been found that traditional assemblies, and particularly star-shaped or three phase triangle-shaped power assemblies, lead to the formation of many conducting local loops that amplify the induced currents liable of crossing the assembly.

By proposing that each power-supply conductor be associated with a neutral conductor and are regrouped, the phase and neutral conductors are always side by side and, thus, the surface of the loops formed by the different conductors, is minimized and reduced. The induced electric currents are hence, highly reduced and it is possible to simplify dimension as a result to anti-lightening components.

Advantageously, the electric heating member is powered by a preferentially three-phase alternative current.

In one form, each phase is bifilar and comprises a phase and a neutral or "ground" conductor. The electrical wire may be twisted or not.

Advantageously, the electric heating member has at least one side and the power-supply and neutral conductors are arranged on this same side.

According to another form, the heating member is a heating carpet or ribbon.

Advantageously, the heating member comprises at least one resistive coil arranged between a power-supply conductor and its associated neutral conductor. Advantageously still, the resistive coil is arranged according to at least two coil paths.

In one form, the two paths are substantially parallel.

In another form, the coil extends substantially along a length of the heating member.

The present disclosure also relates to a turbojet engine nacelle, characterized in that it comprises an assembly of air inlet lip according to the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
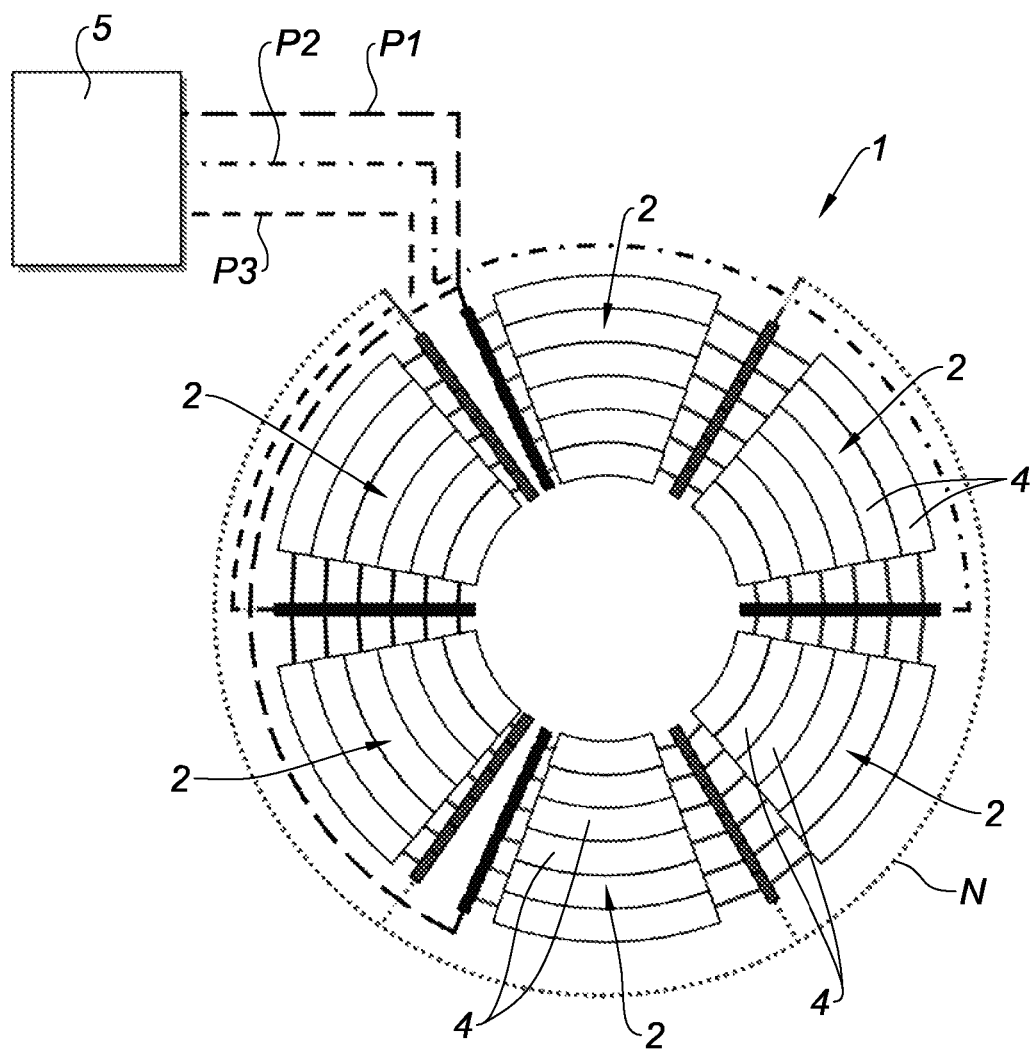
FIG. 1 is a schematic representation of a set of heating members arranged on the periphery of an air inlet lip and powered by a star mounted three-phase network according to the prior art.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As schematically represented on FIG. 1, a de-icing system assembly 1 equipping an air inlet lip assembly of a turbojet engine nacelle includes a plurality, here six, of groups 2 of electrical heating members 4 arranged regularly on the periphery of the air inlet, each group 2 of electric heating members 4 itself comprising a plurality of electrical heating members 4 arranged radially. (here six heating members 4 per group 2).

The de-icing assembly 1 is powered by a three-phase power source 5 comprising a first phase conductor P1 (-), a second phase conductor P2 (- • -) and a third phase conductor P3 (- - -). The power also includes a neutral connector N (. . . . . . . .).

Each group 2 and heating member 4 of said group is connected firstly to a phase connector P1, P2 or P3, and secondly, to a neutral connector N.

Conventionally, FIG. 1 shows a star-shaped mounting of the de-icing system 1 according to the prior art.

In such a configuration, the electric power supply crosses the heating members 4, the phase conductor P1, P2, P3 entering from one side of said member 4 and exiting in neutral N by an opposite side.

Neutral conductors are connected together and form a floating neutral.

As previously explained, such a mounting diagram causes the formation of many inductive loops covering a large surface of the de-icing system 1.

Figure 2:
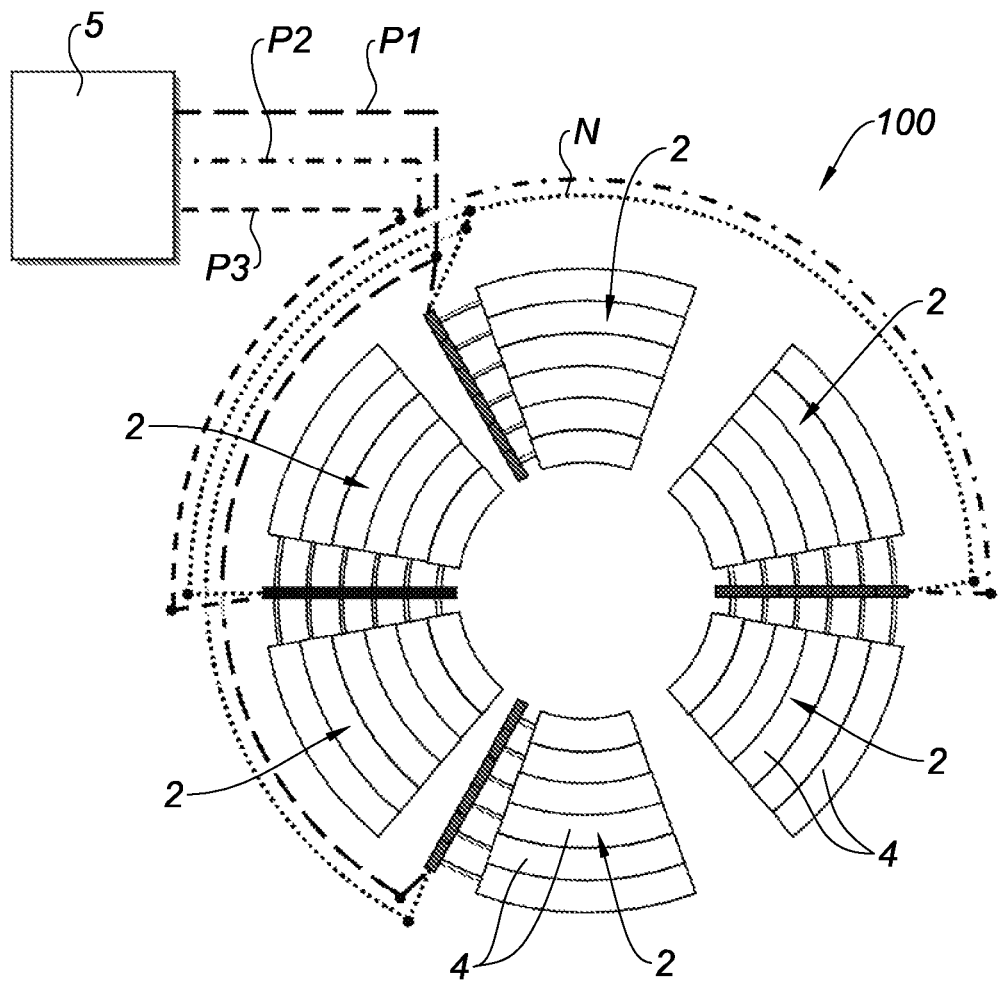
FIG. 2 is a schematic representation of a set of heating members arranged on the periphery of an air inlet lip and supplied by a mounted three-phase network according to the present disclosure.

FIG. 2 shows a mounting diagram according to the present disclosure of a de-icing system 10.

The mounting of FIG. 2 differs from the star mounting according to the prior art due to the fact that for each heating member 4, the phase conductor P1, P2, P3 is regrouped on the same side and adjacent to the neutral conductor N.

Advantageously, the power inputs and outputs of the heating members are bifilar comprising a phase conductor P1, P2, P3 and a neutral conductor N.

It is clear from FIG. 2 that the inductive loops likely to be formed are on the one hand less, and on the other hand, offer a reduced surface.

Figure 3:
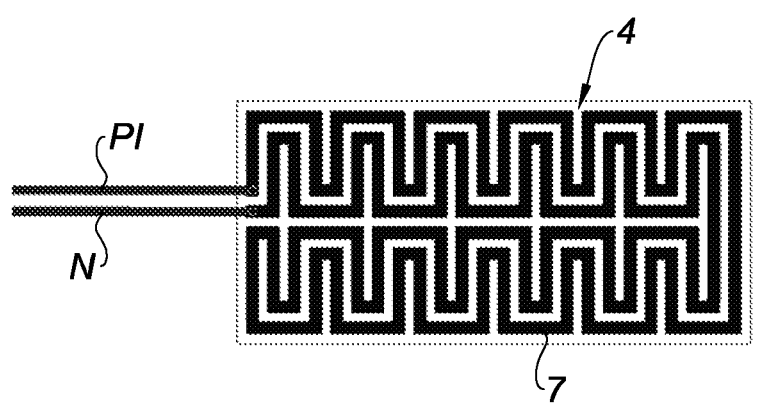
FIG. 3 is a schematic representation of a heating member according to the present disclosure equipping an assembly as shown in FIG. 2.

FIG. 3 illustrates a heating member 4 advantageously equipping the de-icing system 100.

The heating member 4 is substantially in the form of a carpet, or a rectangular strip within which circulates a resistive heating member 7, forming a coil.

Unlike the prior art, the resistive heating member 7 no longer forms a coil crossing the heating member 4 which exhibited a conductive member P1, P2, P3 and a neutral conductor N on opposite sides, but exhibits a coil which is arranged such as to form two substantially parallel paths along the heating member 4.

Such an arrangement makes it possible to considerably reduce the surface of the inductive loop formed by the coil.

The coil wiring as well as the wiring of the aforementioned de-icing system make it possible to reduce and especially avoid the over-sizing of the size of the protective anti-lightening components present in the various electrical organs of the nacelle and aircraft.

Specifically, such an arrangement may be termed "differential" insofar as an induced current generating a disturbance, circulates in a substantially identical manner on both phase connectors P1, P2, P3 and t neutral N and in the heating member 4. The indirect effects induced by lightning in the de-icing system currents are minimized.

What is claimed is:

1. An electric de-icing system for a lip assembly of a turbojet engine nacelle of an aircraft comprising:
   a plurality of electrical heating groups arranged around a periphery of the lip assembly, each group comprising a plurality of electrical heating members, each of said groups being electrically powered through a plurality of power-supply conductors and a plurality of neutral conductors arranged in pairs, wherein each of the plurality of electrical heating members define a ribbon shape having two parallel paths, one parallel path for a neutral conductor and another parallel path for the corresponding power-supply, wherein the parallel paths are connected to a pair of power-supply conductors and neutral conductors on a common side of the groups of electrical heating members such that one pair of power-supply conductors and neutral conductors is connected to at least two groups of electrical heating members.

2. The lip assembly according to claim 1, wherein the plurality of electrical heating members are powered by an alternative current.

3. The lip assembly according to claim 2, wherein the plurality of electrical heating members are powered by three-phase current.

4. The lip assembly according to claim 1, wherein the electrical heating members are a heating carpet or ribbon.

5. The lip assembly according to claim 1, wherein each electrical heating member comprises at least a resistive coil arranged between the power-supply conductor and the neutral conductor associated therewith.

6. The lip assembly according to claim 5, wherein the resistive coil substantially extends along a length of the electrical heating member.

7. A turbojet engine nacelle comprising a lip assembly according to claim 1.

* * * * *